(12) United States Patent
Saiki et al.

(10) Patent No.: US 8,641,087 B2
(45) Date of Patent: Feb. 4, 2014

(54) PASSENGER PROTECTION OF VEHICLE (75) Inventors: Hideharu Saiki, Hiroshima (JP);
Kazuya Fukutani, Hiroshima (JP);
Hideharu Kaeriyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 19 days.

(21) Appl. No.: 13/290,543

(22) Filed: Nov. 7, 2011

(65) Prior Publication Data
US 2012/0119476 A1    May 17, 2012

(30) Foreign Application Priority Data
Nov. 16, 2010 (JP) ................................ 2010-255667

(51) Int. Cl.
*B60R 21/213* (2011.01)
(52) U.S. Cl.
USPC .................................. 280/730.2; 380/743.1
(58) Field of Classification Search
USPC ........................................ 280/730.2, 743.1
See application file for complete search history.

(56) References Cited

U.S. PATENT DOCUMENTS

| 6,527,296 | B2 * | 3/2003 | Bakhsh et al. | 280/730.2 |
|---|---|---|---|---|
| 6,616,179 | B2 * | 9/2003 | Tanase et al. | 280/730.2 |
| 6,811,184 | B2 * | 11/2004 | Ikeda et al. | 280/742 |
| 7,407,182 | B2 * | 8/2008 | Aoki et al. | 280/730.2 |
| 7,520,527 | B2 * | 4/2009 | Yamagiwa et al. | 280/730.2 |
| 7,607,684 | B2 * | 10/2009 | Downey et al. | 280/730.2 |
| 7,762,581 | B2 * | 7/2010 | Kino et al. | 280/730.2 |
| 7,789,418 | B2 * | 9/2010 | Wipasuramonton et al. | 280/730.2 |
| 8,286,991 | B2 * | 10/2012 | Shimazaki et al. | 280/728.2 |
| 2005/0116451 | A1 * | 6/2005 | Kino et al. | 280/730.2 |
| 2005/0212270 | A1 * | 9/2005 | Wipasuramonton et al. | 280/730.2 |
| 2006/0017267 | A1 * | 1/2006 | Fink | 280/730.2 |
| 2006/0082108 | A1 * | 4/2006 | Wahara et al. | 280/730.2 |
| 2007/0001433 | A1 * | 1/2007 | Gu et al. | 280/729 |
| 2008/0054606 | A1 * | 3/2008 | Mitsuo et al. | 280/730.2 |
| 2012/0032427 | A1 * | 2/2012 | Ochiai et al. | 280/730.2 |

FOREIGN PATENT DOCUMENTS

JP  2002-362293 A  12/2002
JP  2009-012688 A   1/2009

OTHER PUBLICATIONS

Translation of the Office Action issued by the German Patent and Trade Mark Office on Feb. 28, 2013, which corresponds to German Patent Application No. 10 2011 117 872.8 and is related to U.S. Appl. No. 13/290,543.

* cited by examiner

*Primary Examiner* — James English
(74) *Attorney, Agent, or Firm* — Studebaker & Brackett PC (57) ABSTRACT

A cell of a curtain airbag is configured such that its upper portion is closed in an inflated state of the curtain airbag, whereas its lower portion is open and connected to a gas flowing passage from an inflator. Accordingly, a passenger protection device of a vehicle which can properly prevent an interior material from being broken and scattered can be provided.

5 Claims, 6 Drawing Sheets

PASSENGER PROTECTION OF VEHICLE

BACKGROUND OF THE INVENTION

The present invention relates to a passenger protection device of a vehicle, in which an inflator generates inflatable gas in a vehicle collision, particularly in a vehicle side collision, and thereby a curtain airbag is inflated downwardly along a side portion of a vehicle compartment to protect a head portion of a passenger.

Vehicles have been recently equipped with a curtain airbag to protect a passenger against an impact load acting from a vehicle side, in addition to an airbag to protect the passenger against an impact load acting from a vehicle front. That is, the curtain airbag is arranged in its folded state, for example, in a bellows-shaped folded state, on the inside of the vehicle compartment along a vehicle-body side portion (see a roof side and a front pillar), an interior material is provided at the vehicle-body side portion to cover the curtain airbag in the folded state, and an inflator to generate inflatable gas in a vehicle collision is connected to the curtain airbag such that the inflatable gas is supplied to the curtain airbag so as to inflate the curtain airbag downwardly along the vehicle-body side portion in the vehicle collision over an area including both a front seat and a rear seat.

A conventional curtain airbag, in general, comprises plural cells (small chambers), which are configured such that upper portions thereof are open in an inflated state of the curtain airbag, whereas lower portion thereof are closed in the inflated state of the curtain airbag, so that the inflatable gas from the inflator is supplied into the respective cells through a gas flowing passage formed at a connection portion which is provided at the upper portions of the cells.

When the above-described conventional curtain airbag is inflated, the above-described interior material is deformed (pushed out) by its inflation pressure, then the curtain airbag comes out of a gap formed between the vehicle-body side portion and a vehicle-outside end portion of the interior material. In this case, since the gas flows into the cells from their open upper portions, a base portion of the curtain airbag in the folded state expands so quickly that a smooth inflation of the curtain airbag as a whole may be prevented. Consequently, the base portion of the curtain airbag quickly expanding may apply a momentary load to the interior material, so that there is a concern that the interior material may be broken and scattered.

Japanese Patent Laid-Open Publication Nos. 2002-362293 and 2009-12688 disclose the passenger protection device of a vehicle to protect the passenger against the load of the vehicle side collision, in which the curtain airbag comprises the plural cells and a gas passage extending in a vehicle longitudinal direction is formed on an upper side of the cells in an inflated state of the curtain airbag. Herein, the prior art disclosed in the above-described patent documents has a structure in which the inflatable gas flows into the cells from the upper side when the curtain airbag is inflated, so this structure of the prior art may have the same problem as well.

SUMMARY OF THE INVENTION

An object of the present invention is to provide a passenger protection device of a vehicle which can properly prevent the interior material from being broken and scattered.

According to the present invention, there is provided a passenger protection device of a vehicle, comprising a curtain airbag arranged in a folded state on a vehicle-compartment inside along a vehicle-body side portion, an interior material provided at the vehicle-body side portion to cover the curtain airbag in the folded state, an inflator to generate inflatable gas in a vehicle collision, wherein the inflator is connected to the curtain airbag such that the inflatable gas is supplied to the curtain airbag so as to inflate the curtain airbag downwardly in the vehicle collision, and the curtain airbag comprises plural cells and at least one of the plural cells of the curtain airbag is configured such that an upper portion thereof is closed in an inflated state of the curtain airbag, whereas a lower portion thereof is open and connected to a gas flowing passage from the inflator in the inflated state of the curtain airbag.

According to the present invention, since the lower portion of the above-described cell is open and connected to the gas flowing passage, the gas flows into the cell from its open side, i.e., its lower side, when the curtain airbag comes out of a gap between the vehicle-body side portion and a vehicle-outside end portion of the interior material, deforming (pushing out) the interior material, in the case of the inflation of the curtain airbag. Accordingly, the base portion of the curtain airbag in the folded state can be properly prevented from expanding quickly. Consequently, the curtain airbag can be smoothly inflated downwardly and the interior material can be prevented from being broken and scattered.

According to an embodiment of the present invention, the curtain airbag is arranged in the folded state along a front pillar portion from a roof side portion and covered with a top ceiling provided at least at the roof side portion and a front pillar trim provided at least at the front pillar portion, and the above-described at least one of the plural cells of the curtain airbag is covered with the front pillar trim in the folded state of the curtain airbag. Thereby, since the lower portion of the above-described cell is open and connected to the gas flowing passage, the gas flows into the cell from its open side, i.e., its lower side, when the curtain airbag comes out of a gap between the roof side portion and a vehicle-outside end portion of the front pillar trim, deforming (pushing out) the front pillar trim having a relatively high rigidity, in the case of the inflation of the curtain airbag. Accordingly, the base portion of the curtain airbag in the folded state can be properly prevented from expanding quickly. Consequently, the curtain airbag can be smoothly inflated downwardly and the front pillar trim can be prevented from being broken and scattered.

According to another embodiment of the present invention, the cell covered with the front pillar trim is an end-side cell which is positioned on a vehicle front-end side, the plural cells of the curtain airbag further comprises an adjacent cell which is provided adjacent to the end-side cell and covered with a front portion of the top ceiling in the folded state of the curtain airbag, and the end-side cell and the adjacent cell are configured such that respective upper portions thereof are closed in the inflated state of the curtain airbag, whereas respective lower portions thereof are open and connected to the gas flowing passage from the inflator in the inflated state of the curtain airbag. Thereby, the gas flows into the end-side cell and the adjacent cell from their open sides, i.e., their lower sides. Accordingly, when the gas flows in order of the adjacent cell and then the end-side cell from the vehicle rear side, the adjacent cell located behind the front pillar trim is inflated by the gas flowing in from its lower side, so that the front pillar trim can be easily deformed (pushed out) inwardly in the vehicle width direction. Consequently, the curtain airbag can be inflated more smoothly and the front pillar trim can be further prevented from being broken and scattered.

According to another embodiment of the present invention, the curtain airbag is configured to be inflated along a side portion of the vehicle compartment comprised of a front-seat space and a rear-seat space, the curtain airbag comprises a connection portion which is connected to the inflator and positioned between the front-seat space and the rear-seat space, and part of the curtain airbag which corresponds to a rear-seat side is covered with the top ceiling in the folded state of the curtain airbag and has an upper portion which is configured to be open in the inflated state of the curtain airbag. Thereby, since the connection portion of the curtain airbag to the inflator is positioned between the front-seat space and the rear-seat space, i.e., at a central portion, in the longitudinal direction, of the curtain airbag in the folded state, the gas from the inflator can be properly distributed. Accordingly, the quick and proper gas supply can be provided for both the front-seat space and the rear-seat space, so that the smooth inflation of the curtain airbag can be achieved, preventing the front pillar trim from being broken and scattered.

According to another embodiment of the present invention, a guide member which encloses part of the curtain airbag in the folded state which corresponds to an adjacent portion of the front pillar trim and the top ceiling and guides an inflation of the curtain airbag in the inflated state is provided, and the guide member is fixed to the vehicle-body side portion and covered with the top ceiling and the front pillar trim. Thereby, since the inflation direction of the curtain airbag is guided by the guide member in addition to preventing the base portion of the curtain airbag in the folded state from expanding improperly quickly, the more smooth inflation of the curtain airbag can be provided.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
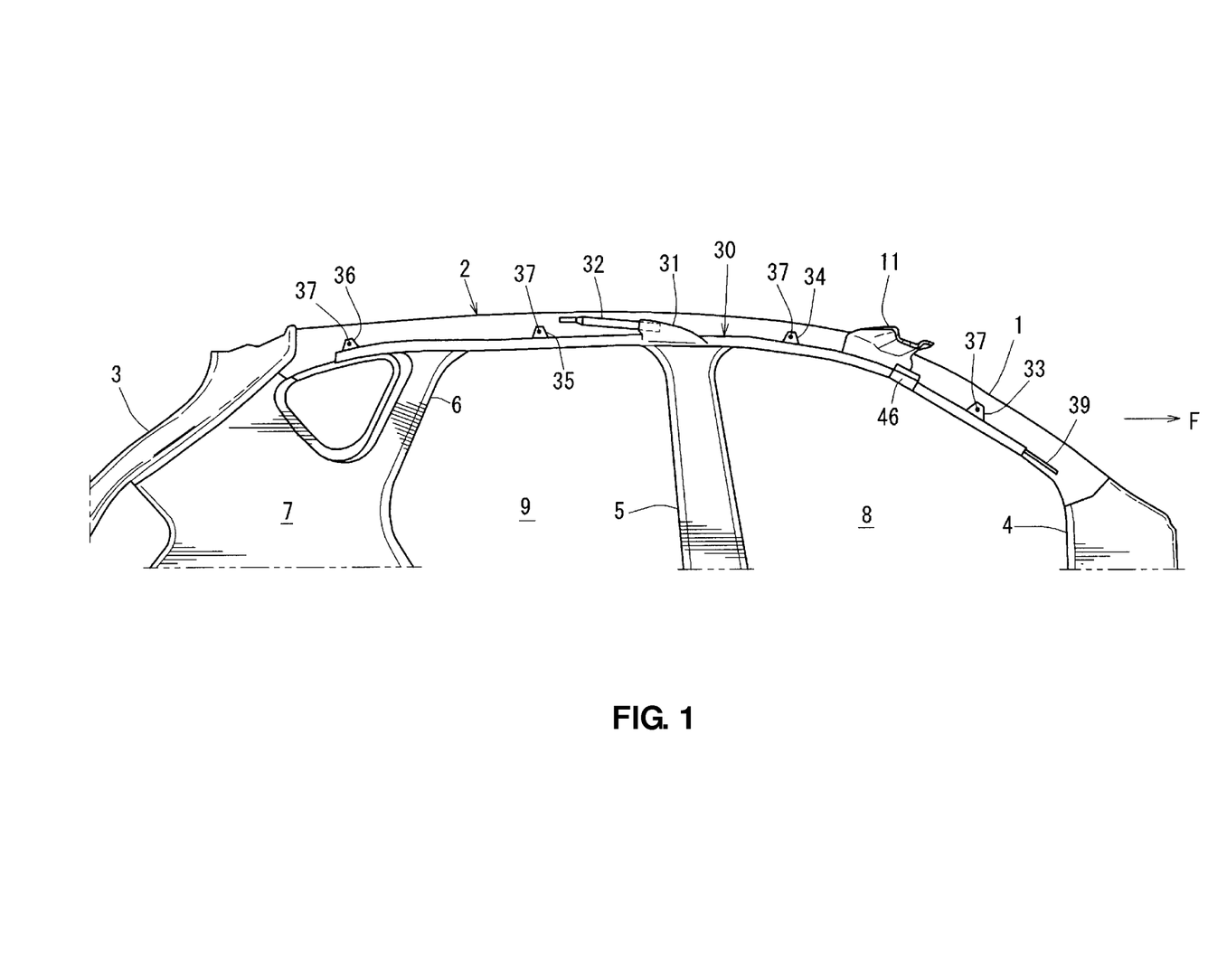
FIG. 1 is a side view showing a passenger protection device of a vehicle according to the present invention.
Figure 2:
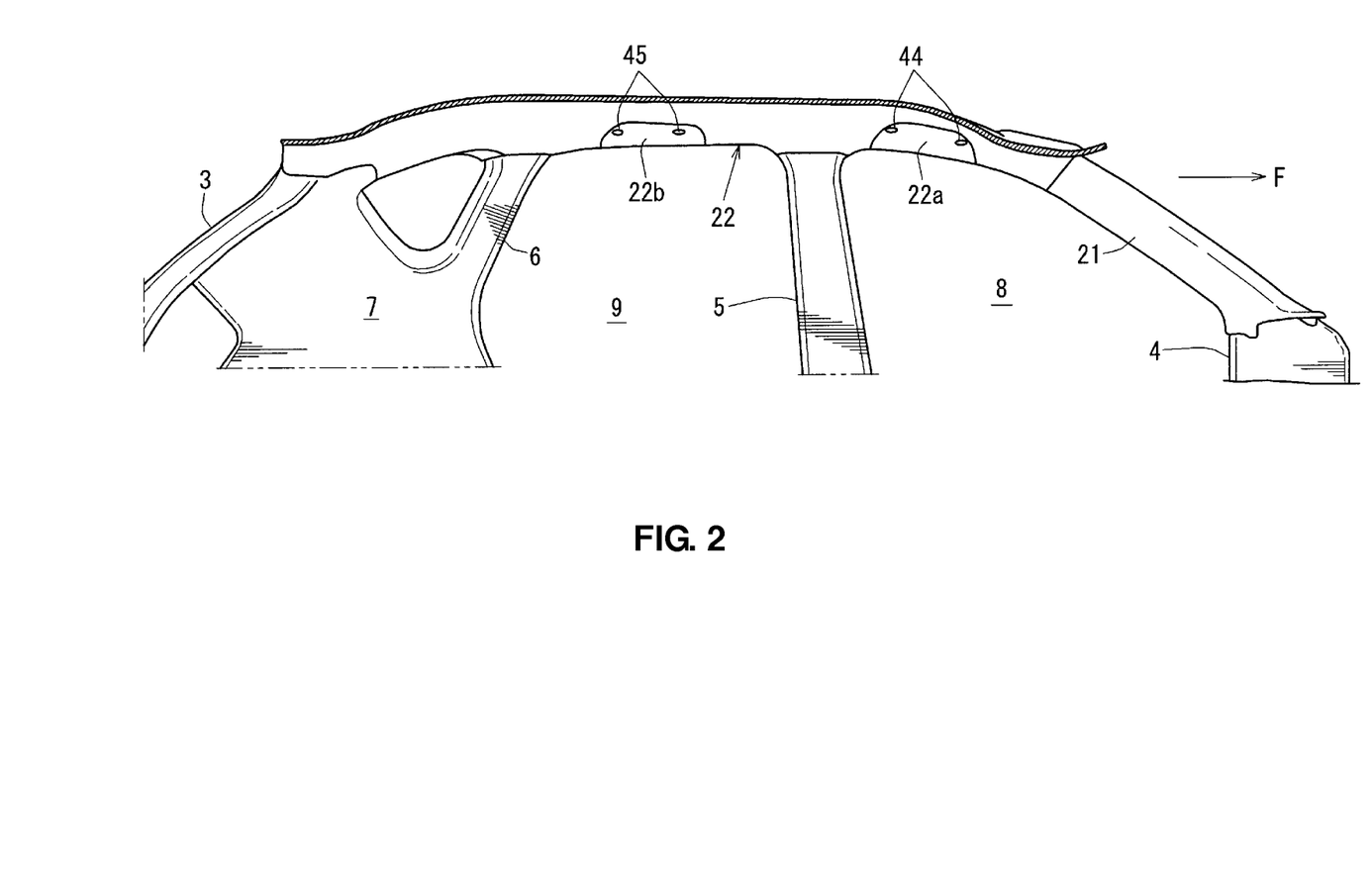
FIG. 2 is a side view showing an arrangement structure of an interior material.
Figure 3:
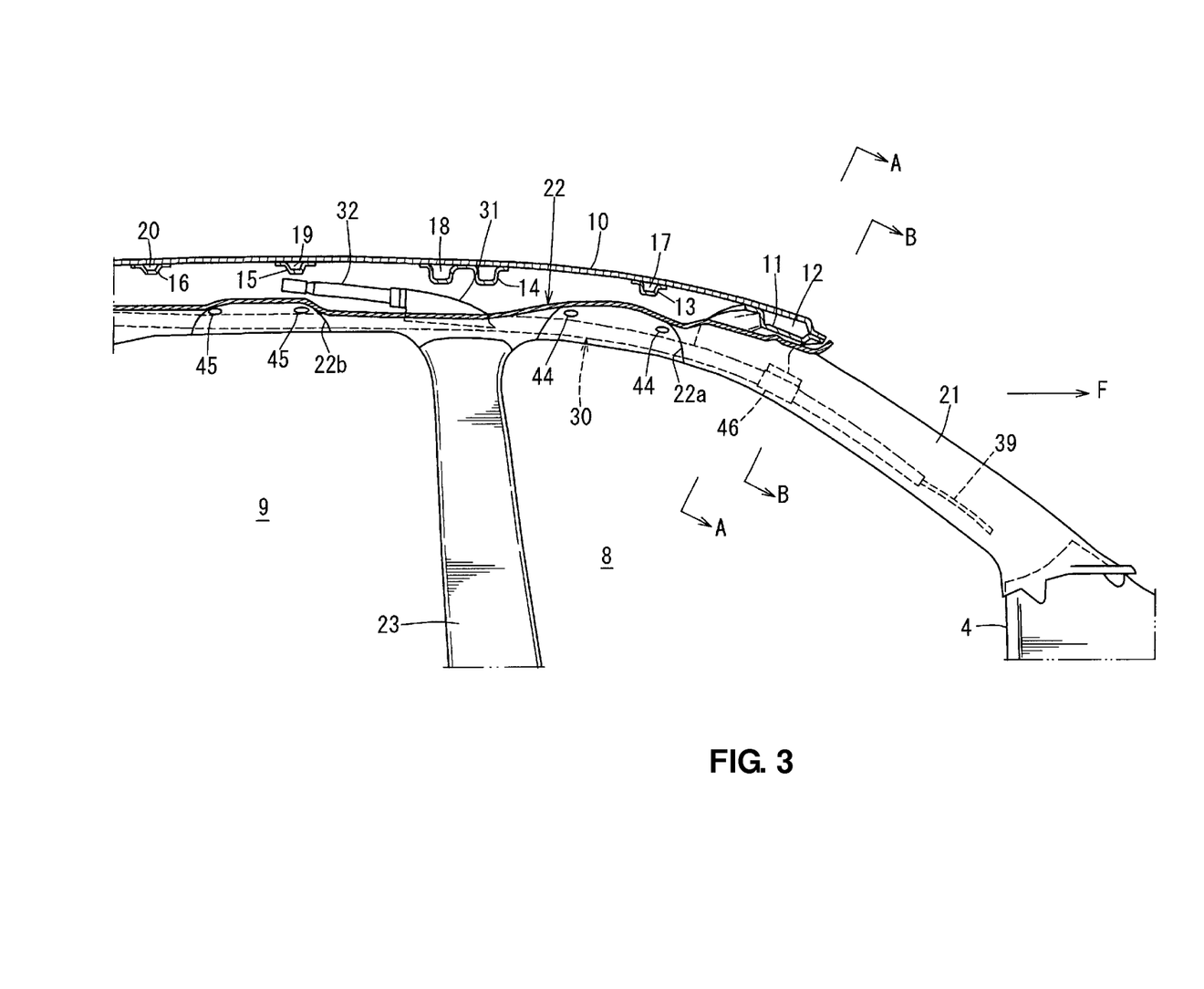
FIG. 3 is a major-part enlarged side view showing an arrangement structure of a curtain airbag.

Figures show a passenger protection device of a vehicle, and FIG. 1 is a side view showing a structure in which a curtain airbag is arranged in a bellows-shaped folded state, omitting illustration of a roof panel and an interior material (a top ceiling, a front pillar trim), when viewed from an inside of a vehicle compartment, FIG. 2 is a side view showing a state in which the interior material (the top ceiling, the front pillar trim) is attached to the vehicle-body structure of FIG. 1, and FIG. 3 is a major-part enlarged side view showing an arrangement structure of the curtain airbag.

First, a vehicle-body structure of a side portion will be described referring to FIGS. 1 through 3. A front pillar 1, which has a closed cross section and extends obliquely with its rear potion located relatively above a level of its front portion, is provided, and a roof side rail 2, which has a closed cross section and extends rearwardly, is provided continuously from an upper end portion of the front pillar 1. Further, a rear pillar 3, which has a closed cross section and extends obliquely with its rear potion located relatively below a level of its front portion, is provided continuously from a rear end portion of the rear pillar 3.

A hinge pillar 4, which has a closed cross section and extends vertically, is provided continuously from a front end portion of the front pillar 1, a center pillar 5, which has a closed cross section and extends vertically, is provided continuously from a central portion, in the vehicle longitudinal direction, of the roof side rail 2, and a rear quarter panel 7, which is equipped with a quarter pillar 6, is provided between a lower side of a rear portion of the roof side rail 2 and a front portion of the rear pillar 3. The hinge pillar 4, the front pillar 1, the roof side rail 2, the center pillar 5, and a side sill (not illustrated) form a vehicle-body opening for front door 8 (a door opening for front-seat passenger). The center pillar 5, the roof side rail 2, the quarter pillar 6, and the side sill (not illustrated) form a vehicle-body opening for rear door 9 (a door opening for rear-seat passenger).

The figures show only a left-side part of the vehicle, but a right-side part of the vehicle has a symmetrical structure with respect to the left-side part of the vehicle. A roof panel 10 (see FIG. 3) is provided between a pair of roof side rails 2, 2. A front header 11 is provided to extend in the vehicle width direction and interconnect a pair of connection portions which are formed between the upper ends of the right-and-left front pillars 1, 1 and the front ends of the right-and-left roof side rails 2, 2. A header closed-cross section 12 is formed between the front header 11 and the roof panel 10, thereby ensuring a proper vehicle-body rigidity of the upper portion.

Further, as shown in FIG. 3, to a lower face of the roof panel 10 are attached plural roof reinforcements 13, 14, 15, 16 extending in the vehicle width direction at intervals longitudinally, so that roof closed-cross sections 17, 18, 19, 20 extending in the vehicle width direction are formed between the roof panel 10 and the respective roof reinforcements 13, 14, 15, 16, thereby ensuring a proper vehicle-body rigidity of the upper portion (roof). The above-described front pillar 1 is covered with a front pillar trim 21 from the inside of the vehicle compartment as shown in FIGS. 2 and 3, and this front pillar trim 21 is fixed to the front pillar 1 via attachment members, such as clips.

As shown in FIGS. 2 and 3, the roof panel 10, the roof reinforcements 13-16, the front header 11, a rear header (not illustrated), and the roof side rail 2 are covered with a top ceiling 22 from the inside of the vehicle compartment. This top ceiling 22 is fixed to the front header 11, the rear header (not illustrated), and the roof reinforcements 13-16 via attachment members, such as clips, and arranged on the vehicle inside of the roof side rail 2. In FIG. 3, reference numeral 23 denotes a center pillar trim which is arranged on the vehicle inside of the center pillar 5.

Figure 4:
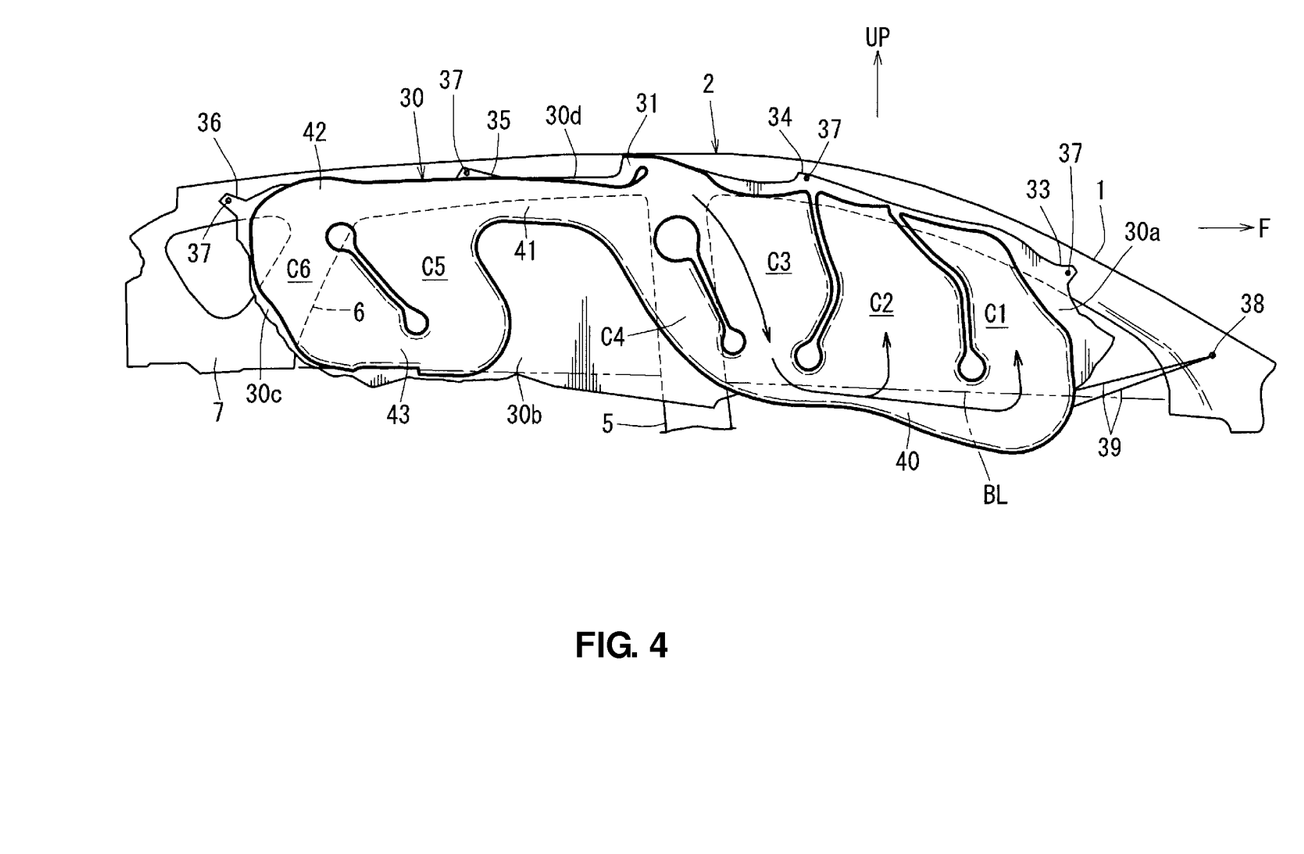
FIG. 4 is a side view showing an inflation state of the curtain airbag.

FIG. 4 is a side view showing an inflation state of the curtain airbag 30, and the curtain airbag 30 shown in FIG. 4 is folded in a bellows shape and arranged on the vehicle inside along the front pillar 1 from the roof side rail 2 as shown in FIGS. 1 and 3.

As shown in FIGS. 1 and 3, the curtain airbag 30 is connected to an inflator 32 via a portion thereof between a front-seat space and a rear-seat space, that is, via a connection portion 31 thereof which is provided at a specified position which corresponds to the center pillar 5, and the gas from the inflator 32 flows into the curtain airbag 30 from its central portion in the longitudinal direction, thereby improving distribution of the gas.

As shown in FIG. 3, the curtain airbag 30, which is arranged along the roof side rail 2 and the front pillar 1 as a side portion of the vehicle body, is covered with the top ceiling 22 and the front pillar trim 21, and the gas which is generated by the inflator 32 in a vehicle collision (a side collision, in particular) expands the curtain airbag 30 such that the curtain airbag 30 is inflated downwardly along the side portion of the vehicle compartment as shown in FIG. 4.

A structure of inflation of the curtain airbag 30 will be described referring to FIG. 4. The curtain airbag 30 is made of two sheets of closes, and the inside of that is partitioned by seams into plural cells: an end-side cell C1, an adjacent cell C2, middle cells C3, C4, and rear cells C5, C6. Further, non-expansion portions 30a, 30b, 30c, 30d into which no gas flows from the inflator 32 are formed in the curtain airbag 30.

At the above-described non-expansion portions 30a, 30c, 30d are integrally formed support pieces 33, 34, 35, 36 to support and fix the curtain airbag 30 to the front pillar 1 and the roof side rail 2. These support pieces 33, 34, 35, 36 are, as shown in FIGS. 1 and 4, fixed to the front pillar 1 and the roof side rail 2 via attachment members 37 . . . , such as clips or bolts. Herein, the above-described non-expansion portion 30b restricts an inflation direction of the curtain airbag 30.

A tether 39 is configured to extend between a lower front portion of the above-described end-side cell C1 and a stopper 38 provided at the front pillar 1 when the curtain airbag 30 is inflated so that the inflation position (shape, location) of the curtain airbag 30 in the inflated state can be properly adjusted. The foremost end-side cell C1 is covered with the front pillar trim 21, and an upper portion of the end-side cell C1 in the inflated state is closed perfectly and only its lower portion is open. This lower-open portion is connected to a lower gas flowing passage 40 to guide in the gas from the inflator 32.

Meanwhile, the adjacent cell C2 adjacent to the end-side cell C1 is covered with a front portion of the top ceiling 22, and this adjacent cell C2 is, like the end-side cell C1, configured such that an upper portion of that in the inflated state is closed perfectly and only its lower portion is open. This lower-open portion is connected to the lower gas flowing passage 40 to guide in the gas from the inflator 32. The above-described middle cells C3, C4 are directly connected to the connection portion 31. These middle cells C3, C4 function as a vertically-extending gas flowing passage, and respective upper portions and lower portions of the middle cells C3, C4 are open and the lower-open portions are connected to the lower gas flowing passage 40.

Further, an upper rear portion of the middle cell C4 and an upper front portion of the rear cell C5 are connected to the gas flowing passage 41 above the non-expansion portion 30b. The gas flowing passage 41 and the rear cells C5, C6 which correspond to the rear-seat position are covered with the top ceiling 22, and the rear cells C5, C6 are, as shown in FIG. 4, configured such that both their upper portions and their lower portions are open, their upper portions are connected to an upper gas flowing passage 42, and their lower portions are connected to a lower gas flowing passage 43.

As shown in FIG. 4, the curtain airbag 30 is configured such that when the curtain airbag 30 is inflated, its lower end is located below a level of a beltline BL of the vehicle which is shown by an imaginary line. This is because an upper body portion of the passenger can be properly prevented from moving out of the vehicle window toward the outside in the vehicle side collision by this configuration of the curtain airbag 30. In this case, a specified portion of the curtain airbag 30 which is located below the level of the beltline BL may be properly comprised of the cell or the gas flowing passage.

The curtain airbag 30 having the inflation state shown in FIG. 4 is arranged such that when it is folded in the bellows shape and attached to the inside of the vehicle compartment along the front pillar 1 from roof side rail 2, it is located below inner-handle attachment portions 44, 45 of recess portions 22a, 22b which are formed at the top ceiling 22 longitudinally as shown in FIG. 3.

Figure 5:
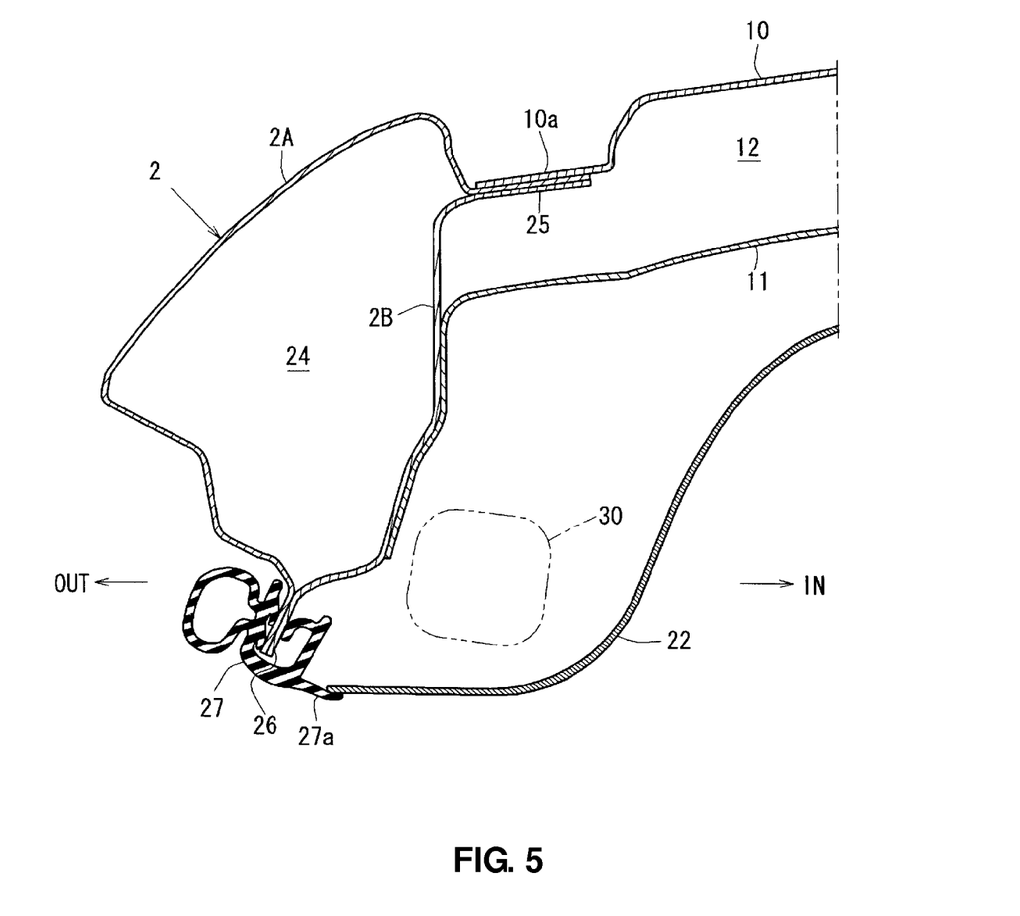
FIG. 5 is a sectional view taken along line A-A of FIG. 3.
Figure 6:
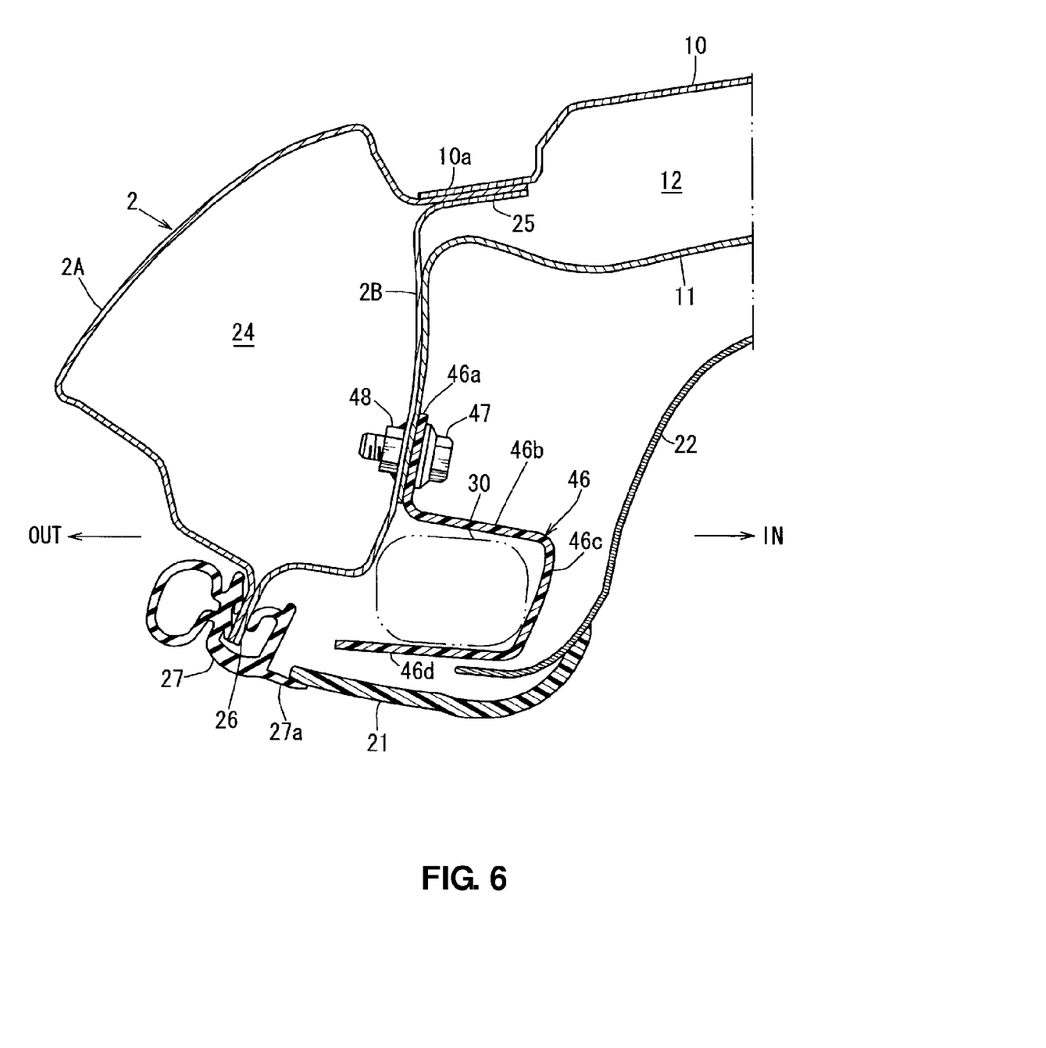
FIG. 6 is a sectional view taken along line B-B of FIG. 3.

FIG. 5 is a sectional view taken along line A-A of FIG. 3, and FIG. 6 is a sectional view taken along line B-B of FIG. 3. In these figures, an area where the curtain airbag 30 is stored is shown by an imaginary line for convenience.

As shown in FIGS. 5 and 6, the roof side rail 2 is comprised of a roof side rail outer 2A and a roof side rail inner 2B, and has a roof-side closed-cross section 24 and upper and lower joint portions 25, 26.

An outside end portion 10a of the roof panel 10 is fixed to the upper joint portion 25 of the roof side rail 2, and a seaming welt 27 is attached to the lower joint portion 26. The seaming welt 27 includes a lip portion 27a, which is configured such that it contacts an outside end portion of the top ceiling 22 shown in FIG. 5 and an outside end portion of the front pillar trim 21 shown in FIG. 6 from the inside of the vehicle compartment As shown in FIG. 6, an adjacent portion of the front pillar trim 21 and the top ceiling 22 is configured such that part of a front end portion of the top ceiling 22 and part of an upper end portion of the front pillar trim 21 are overlapped, the part of the front end portion of the top ceiling 22 being positioned on an upper side (the vehicle outside) and the part of the upper end portion of the front pillar trim 21 being positioned on a lower side (the vehicle inside). A guide member 46 which encloses part of the curtain airbag 30 in the folded state which corresponds to the above-described adjacent portion of the both members 21, 22 is provided, and this guide member 46 is fixed to the roof side rail inner 2B as a vehicle-body side portion.

The guide member 46 comprises an attachment piece 46a, an upper piece 46b, a side piece 46c, and a lower piece 46d, and the pieces 46b, 46c, 46d are formed in a U shape. This guide member 46 guides the inflation of the curtain airbag 30 toward the lower joint portion 26 of the roof side rail 2.

Further, the above-described guide member 46 is attached to the roof side rail inner 2B by using attachment members, such as a bolt 47 and a nut 48, and covered with the top ceiling 22 and the front pillar trim 21 from the inside of the vehicle compartment. Herein, in the figures, an arrow F shows the vehicle front side, an arrow IN shows the vehicle inside, and an arrow OUT shows the vehicle outside.

Hereinafter, operations of the embodiment having the structure described above will be described. When the vehicle collision (the vehicle side collision, in particular) occurs or is predicted, the inflator 32 operates and the inflatable gas generated by the inflator 32 flows into the curtain airbag 30 via the connection portion 31 provided at the center, in the vehicle longitudinal direction, of the curtain airbag 30. Accordingly, the curtain airbag 30 expands and is inflated downwardly along the side portion of the vehicle compartment, so that the head portion of the front-seat passenger and/or the rear-seat passenger can be properly protected. In this case, since the lower portion of the specified cell of the curtain airbag 30 which is covered with the front pillar trim 21, i.e., the end-side cell C1, is open and connected to the lower gas flowing passage 40 as shown in FIG. 4, the gas flows into this cell from its open side, i.e., its lower side, when the curtain airbag 30 comes out of the gap between the roof side rail inner 2B and the vehicle-outside end portion of the front pillar trim 21, deforming (pushing out) the front pillar trim 21 having the relatively high rigidity toward the inside of the vehicle compartment, in the case of the inflation of the curtain airbag 30. Accordingly, the base portion of the curtain airbag 30 in the folded state can be properly prevented from expanding quickly. Consequently, the curtain airbag 30 can be smoothly inflated downwardly and the front pillar trim 21 can be prevented from being broken and scattered.

Specifically, since the gas flows into the end-side cell C1 only from the lower side, the lower portion of the end-side cell C1 connected to the lower gas flowing passage 40 expands earlier than the upper portion of the end-side cell C1 does and an expansion pressure acting downwardly causes the curtain airbag 30 to be inflated downwardly, coming out of the above-described gap, in a state in which an expansion volume does not become improperly excessive. Accordingly, it is fine that the above-described gap has a small-sized opening, and the front pillar trim 21 is deformed (pushed out) by the inflation pressure, thereby preventing the front pillar trim 21 from being broken and scattered properly.

Herein, in the conventional structure in which the gas flows into the end-side cell from the upper side, the upper portion of the end-side cell connected to the gas flowing passage expands earlier than the lower portion of the end-side cell does and an expansion pressure acting downwardly causes the curtain airbag to be inflated downwardly so quickly in a state in which an expansion volume has become improperly excessive. Therefore, it may be necessary that the above-described gap has a rather large-sized opening, and the front pillar trim is deformed (pushed out) so quickly by the inflation pressure, so that a quick (momentary) load is applied to the front pillar trim and thereby there is a concern that the front pillar trim may be broken and scattered. The gas flows into the adjacent cell C2 covered with the front portion of the top ceiling 22 from the lower side as the open side of the adjacent cell C2, like the above-described end-side cell C1.

That is, the gas from the inflator 32 flows in order of the adjacent cell C2 and then the end-side cell C1 via the connection portion 31, the middle cell C3, and the lower gas flowing passage 40, so that the gas flows into the adjacent cell C2 located behind the front pillar trim 21 only from the lower side and inflates the adjacent cell C2. Thus, the inflation of this adjacent cell C2 deforms (pushes) the top ceiling 22 (having a lower rigidity than the front pillar trim 21) inwardly in the vehicle width direction, so that the top ceiling 22 which is partially overlapped with the front pillar trim 21 pushes the front pillar trim 21 inwardly in the vehicle width direction. Accordingly, the front pillar trim 21 can be easily deformed inwardly in the vehicle width direction, so that the curtain airbag 30 can be inflated more smoothly and the front pillar trim 21 can be further prevented from being broken and scattered.

Further, since the connection portion 31 of the curtain airbag 30 to the inflator 32 is positioned between the front-seat space and the rear-seat space, i.e., at the central portion, in the longitudinal direction, of the curtain airbag 30 in the folded state, specifically, the position corresponding to the center pillar 5, the gas from the inflator can be properly distributed. Accordingly, the quick and proper gas supply can be provided for the cells C1, C2, C3 of the front-seat space and the cells C5, C6 of the rear-seat space, so that the smooth inflation of the curtain airbag 30 can be achieved, preventing the front pillar trim 21 from being broken and scattered. Herein, the gas from the inflator 32 flows into the above-described rear cells C5, C6 via the connection portion 31, the gas flowing passage 41, and upper gas flowing passage 42.

As described above, the passenger protection device of a vehicle according to the present embodiment comprises the curtain airbag 30 arranged in the folded state on the inside of the vehicle compartment along the vehicle-body side portion (see the roof side rail 2, the front pillar 1), the interior material (see the top ceiling 22, the front pillar trim 21) provided at the vehicle-body side portion to cover the curtain airbag 30 in the folded state, the inflator 32 to generate inflatable gas in the vehicle collision (including at the timing when the vehicle collision is detected or at the timing when the vehicle collision is predicted), wherein the inflator 32 is connected to the curtain airbag 30 such that the inflatable gas is supplied to the curtain airbag 30 so as to inflate the curtain airbag 30 downwardly, and at least the cell C1 of the curtain airbag 30 is configured such that its upper portion is closed in the inflated state of the curtain airbag 30, whereas its lower portion is open and connected to the gas flowing passage (see the lower gas flowing passage 40) from the inflator 32 in the inflated state of the curtain airbag 30 (see FIGS. 3 and 4).

According to the present embodiment, since the lower portion of the above-described cell C1 is open and connected to the gas flowing passage (the lower gas flowing passage 40), the gas flows into the cell C1 from its open side, i.e., its lower side, when the curtain airbag 30 comes out of the gap between the vehicle-body side portion and the vehicle-outside end portion of the interior material (see the front pillar trim 21), deforming (pushing out) the interior material, in the case of the inflation of the curtain airbag 30. Accordingly, the base portion of the curtain airbag 30 in the folded state can be properly prevented from expanding quickly. Consequently, the curtain airbag 30 can be smoothly inflated downwardly and the interior material can be prevented from being broken and scattered.

Concretely, the curtain airbag 30 is arranged in the folded state along the front pillar 1 from the roof side rail 2 and covered with the top ceiling 22 provided at least at the roof side rail 2 and the front pillar trim 21 provided at least at the front pillar 1, and the cell C1 of the curtain airbag 30 is covered with the front pillar trim 21 in the folded state of the curtain airbag 30 (see FIGS. 3 and 4).

Thereby, since the lower portion of the above-described cell C1 is open and connected to the gas flowing passage (the lower gas flowing passage 40), the gas flows into the cell C1 from its open side, i.e., its lower side, when the curtain airbag 30 comes out of the gap between the roof side rail 2 and the vehicle-outside end portion of the front pillar trim 21, deforming (pushing out) the front pillar trim 21 having the relatively high rigidity, in the case of the inflation of the curtain airbag 30. Accordingly, the base portion of the curtain airbag 30 in the folded state can be properly prevented from expanding quickly. Consequently, the curtain airbag 30 can be smoothly inflated downwardly and the front pillar trim 21 can be prevented from being broken and scattered.

Further, the cell C1 covered with the front pillar trim 21 is the end-side cell which is positioned on the vehicle front-end side, the plural cells of the curtain airbag 30 further comprises the adjacent cell C2 which is provided adjacent to the end-side cell C1 and covered with the front portion of the top ceiling 22 in the folded state of the curtain airbag 30, and the end-side cell C1 and the adjacent cell C2 are configured such that their respective upper portions are closed in the inflated state of the curtain airbag 30, whereas their respective lower portions are open and connected to the gas flowing passage (see the lower gas flowing passage 40) from the inflator 32 in the inflated state of the curtain airbag 30 (see FIGS. 3 and 4).

Thereby, the gas flows into the end-side cell C1 and the adjacent cell C2 from their open sides, i.e., their lower sides. Accordingly, when the gas flows in order of the adjacent cell C1 and then the end-side cell C2 from the vehicle rear side, the adjacent cell C2 located behind the front pillar trim 21 is inflated by the gas flowing in from its lower side, so that the front pillar trim 21 can be easily deformed (pushed out)

inwardly in the vehicle width direction. Consequently, the curtain airbag 30 can be inflated more smoothly and the front pillar trim 21 can be further prevented from being broken and scattered.

Moreover, the curtain airbag 30 is configured to be inflated along the side portion of the vehicle compartment comprised of the front-seat space and the rear-seat space, the curtain airbag 30 comprises the connection portion 31 which is connected to the inflator 32 and positioned between the front-seat space and the rear-seat space (see the position corresponding to the center pillar 5), and part (see the rear cells C5, C6) of the curtain airbag 30 which corresponds to the rear-seat side is covered with the top ceiling 22 in the inflated state of the curtain airbag 30 and has the upper portion which is configured to be open in the inflated state of the curtain airbag 30 (see FIGS. 1, 3 and 4).

Thereby, since the connection portion 31 of the curtain airbag 30 to the inflator 32 is positioned between the front-seat space and the rear-seat space, i.e., at the central portion, in the longitudinal direction, of the curtain airbag 30 in the folded state, the gas from the inflator 32 can be properly distributed. Accordingly, the quick and proper gas supply can be provided for both the front-seat space and the rear-seat space, so that the smooth inflation of the curtain airbag 30 can be achieved, preventing the front pillar trim 21 from being broken and scattered.

Additionally, the guide member 46 which encloses part of the curtain airbag 30 in the folded state which corresponds to the adjacent portion of the front pillar trim 21 and the top ceiling 22 and guides the inflation of the curtain airbag 30 in the inflated state is provided, and the guide member 46 is covered with the top ceiling 22 and the front pillar trim 21 (see FIG. 6).

Thereby, since the inflation direction of the curtain airbag 30 is guided by the guide member 46 in addition to preventing the base portion of the curtain airbag 30 in the folded state from expanding improperly quickly, the more smooth inflation of the curtain airbag 30 can be provided.

The correspondent relationships between the present invention and the above-described embodiment are as follows. The vehicle-side portion corresponds to the roof side rail 2 as the roof side portion and the front pillar 1 as the front pillar portion. The interior material corresponds to the top ceiling 22, the front pillar trim 21. The cell covered with the front pillar trim corresponds to the end-side cell C1. The part of the curtain airbag which corresponds to the rear-seat side corresponds to the rear cells C5, C6.

However, the present invention should not be limited to the above-described embodiment, and any other modifications and improvements may be applied within the scope of a sprit of the present invention. For example, the present invention is applicable to a roll-type curtain airbag as well as the above-described curtain airbag foldable in the bellows shape, which can provide the same advantages.

What is claimed is:

1. A passenger protection device of a vehicle, comprising:
    a curtain airbag arranged in a folded state on a vehicle-compartment inside along a vehicle-body side portion, the curtain airbag arranged in the folded state extending along a front pillar portion from a roof side portion;
    an interior material provided at the vehicle-body side portion to cover the curtain airbag in the folded state, the interior material comprising a top ceiling covering a part of the curtain airbag in the folded state which is arranged at the roof side portion and a front pillar trim covering another part of the curtain airbag in the folded state which is arranged at the front pillar portion, a rigidity of the top ceiling being set to be lower than that of the front pillar trim;
    an inflator to generate inflatable gas in a vehicle collision;
    wherein said curtain airbag is made of two sheets of cloth which are joined together by seams, an inside of which is partitioned into plural inflatable cells comprising a front cell, a middle cell, and a rear cell, the front and middle cells being positioned for protection of a head portion of a front-seat passenger, the rear cell being positioned for protection of a head portion of a rear-seat passenger,
    said curtain airbag includes a connection portion, which is connected to said inflator and through which the inflatable gas from the inflator is supplied thereto so as to inflate the curtain airbag downwardly in the vehicle collision, the connection portion being provided to directly connect to said middle cell of the curtain airbag such that the inflatable gas from the inflator is supplied into the middle cell first,
    said front cell is configured such that an upper portion thereof is closed and the front cell is connected to said middle cell only via a lower-located gas flowing passage, and said rear cell is connected to said middle cell only via an upper-located gas flowing passage extending longitudinally,
    said front cell is covered with said front pillar trim in the folded state of the curtain airbag, and said middle and rear cells are covered with said top ceiling in the folded state of the curtain airbag, and
    said front cell is an end-side cell which is positioned on a vehicle front-end side, said plural inflatable cells of the curtain airbag further comprises an adjacent cell which is provided between said end-side cell and said middle cell so as to be adjacent to but separate from the end-side cell and the middle cell, respectively, the adjacent cell being covered with a front portion of said top ceiling in the folded state of the curtain airbag, the adjacent cell being configured such that an upper portion thereof is closed independently from the end-side cell and a lower portion thereof is located below a vertically-center of the curtain airbag and open to said lower-located gas flowing passage such that the adjacent cell is connected to said middle cell only via the lower-located gas flowing passage.

2. The passenger protection device of a vehicle of claim 1, wherein said curtain airbag is configured to be inflated along a side portion of a vehicle compartment comprised of a front-seat space and a rear-seat space, said connection portion is positioned between the front-seat space and the rear-seat space, and part of the curtain airbag which corresponds to a rear-seat side is covered with the top ceiling in the folded state of the curtain airbag.

3. The passenger protection device of a vehicle of claim 1, wherein a guide member which encloses part of said curtain airbag in the folded state which corresponds to an adjacent portion of the front pillar trim and the top ceiling and guides an inflation of the curtain airbag in the inflated state is provided, and said guide member is fixed to the vehicle-body side portion and covered with the top ceiling and the front pillar trim.

4. The passenger protection device of a vehicle of claim 3, wherein said adjacent portion of the front pillar trim and the top ceiling is configured such that part of a front end portion of the top ceiling and part of an upper end portion of the front pillar trim are overlapped, the part of the front end portion of the top ceiling being positioned on a vehicle outside with respect to the part of the upper end portion of the front pillar trim.

5. The passenger protection device of a vehicle of claim 1, wherein said curtain airbag is configured such that a lower end thereof in the inflated state is located below a level of a beltline of the vehicle.

\* \* \* \* \*